July 31, 1934.                S. L. LEBBY                1,968,800
                            LIGHT PROJECTOR
                          Filed July 14, 1933

INVENTOR.
STATES LEE LEBBY
BY
ATTORNEYS.

Patented July 31, 1934

1,968,800

UNITED STATES PATENT OFFICE 1,968,800

LIGHT PROJECTOR

States Lee Lebby, Corning, N. Y., assignor to Corning Glass Works, Corning, N. Y., a corporation of New York Application July 14, 1933, Serial No. 680,465

4 Claims. (Cl. 240—41.38)

This invention relates to improvements in light projectors and more particularly to catadioptric projectors employed for projecting a concentrated beam of light from a source of illumination, and my present application is a continuation in part of my application, Serial Number 519,155, filed February 28, 1931.

For several years past signal engineers have been striving to improve light signalling units and in the interests of economy the work has gone forward without increasing the power consumption of the source of illumination. Hence, devices have been introduced for utilizing the largest possible solid angle of light emitted from the source of illumination. Such efforts are admirably illustrated in Patent Number 1,081,211 issued to William Churchill, December 9, 1913, and Patent Number 1,466,410 issued to Emilio Pascucci, August 28, 1923. Also in my prior Patent 1,740,609 granted December 24, 1929, I disclose a signal mirror having an acceptance angle of 180° so designed as to produce minimum spherical aberration. It is a matter of common knowledge that the well known Mangin mirror cannot be constructed with an acceptance angle of much over 120° without introducing intolerable spherical aberration and, consequently, is not capable of meeting the demands of signal engineers for a projector having the maximum acceptance angle. Parabolic reflectors have been employed but due to the difficulties of producing accurate parabolic surfaces they have met with but little favor for use in signalling devices.

I am aware that toroidal surfaces also have been employed in light projectors of the prior art as is evidenced by Patents 1,435,372 and 1,438,628 granted to Louis Bell, November 14, 1922, and December 12, 1922, respectively, but the convex toroidal surfaces therein disclosed, like parabolic surfaces, are difficult of accurate formation and mirrors formed according to the teachings of these patents cannot be accurately ground and polished.

The object of my invention is to concentrate into a projected beam of light more than one half of the solid angle of the light emitted from a source of illumination without introducing objectionable spherical aberration.

The above and other objects may be accomplished by employing my invention which embodies among its features a mirror having an optical axis, a reflecting surface, and a refracting surface, one of said surfaces comprising a surface of revolution, the generatrix of which is symmetrical about an axis other than the optical axis of the mirror while the other surface is spherical.

Figure 1:
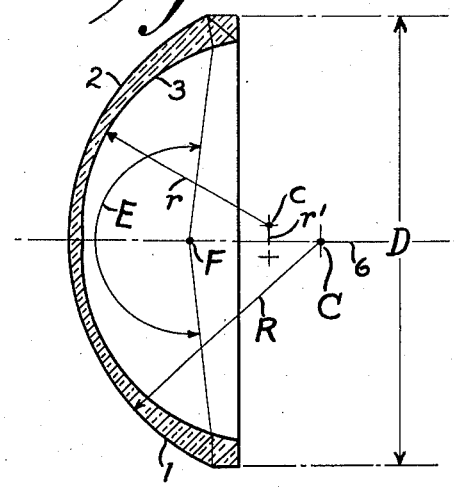
Figure 1 represents a transverse section through a catadioptric projector constructed in accordance with this invention.

In the specific embodiment of my invention herein disclosed, I employ a mirror which consists of a body of revolution having a spherical exterior, or rear, reflecting surface 2 and an anterior, or front, refracting surface 3 which is formed as a surface of revolution, the generatrix 4 of which is symmetrical about an axis 5 which is at an angle to the optical axis 6. By revolving the generatrix 4 or the body of revolution 1 about the axis 6 the surface 3 becomes symmetrical about the axis 6. For grinding and polishing purposes, however, it is important that the generatrix be symmetrical about the axis 5 as it is necessary that the grinding or lapping tool 7 be rotated.

In order to produce a mirror capable of concentrating a solid angle of light of 190° into a beam of substantially parallel light and to reduce spherical abberation to a minimum, that is, so that it does not exceed 1.5°, I have found that for a mirror having a diameter D, the radius R struck from the center C for the spherical reflecting surface must be .557D and the radius $r$ for the generatrix of the anterior surface of revolution must be .417D. The center $c$ for the radius $r$ revolves around the optical axis 6 on a radius $r'$ of .0394D at a distance of .121D from the center C. Placing a light source at the focal point F which is .282D from the center C, it becomes evident that the light acceptance angle E is equal to 190°. By confining the dimensions of the projector to the proportions above specified, it is capable of accepting a very large angle of light and condensing it into a beam of substantially parallel light. Moreover, actual measurements have proven that the spherical aberration produced by a projector so constructed will not exceed 1.5°.

Inasmuch as in my invention circular curves are employed for producing the reflecting surface and a curve symmetrical about an axis other than the optical axis is used in forming the refracting surface, it becomes evident that both surfaces of the device may be easily ground and polished. Moreover, the surfaces of the mold which form the glass may for the same reason be accurately formed and positive control of the production of such mirrors is obtained.

Figure 2:
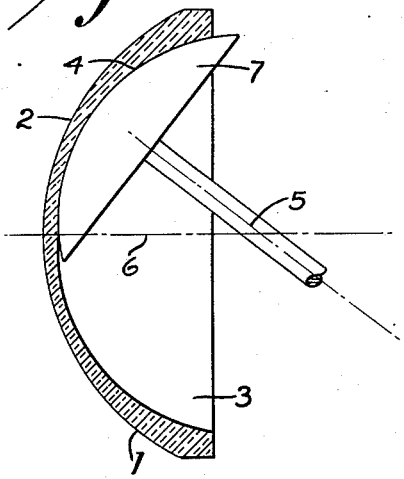
Figure 2 is a transverse sectional view through a mirror in the process of being ground in accordance with my invention.

While in the embodiment of my invention shown in Figures 1 and 2 I have disclosed only the use of circular curves in the formation of my mirror, it is to be understood that any curve which is symmetrical about an axis inclined to the axis of the body of revolution may be employed for producing the surface of revolution according to Figures 1 and 2 without departing from the scope of my invention. Obviously, other constants may be used for producing mirrors in accordance with my invention.

Figure 3:
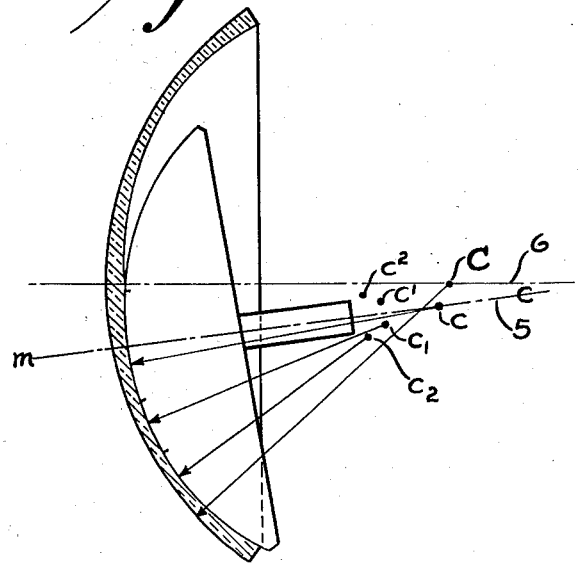
Figure 3 represents another form of my invention in which the generatrix is not geometrically a true arc of a conic section, but approximates an arc of an ellipse.

In Figure 3, for instance, the generatrix is a curve symmetrical around the axis $m-c$, the successive portions thereof being struck with radii of different lengths from the different centers $c$, $c'$ $c^2$, some of which are offset from such axis. Such a curve while not geometrically a portion of a conic section, produces results comparable with that produced by a portion of an ellipse.

Figure 4:
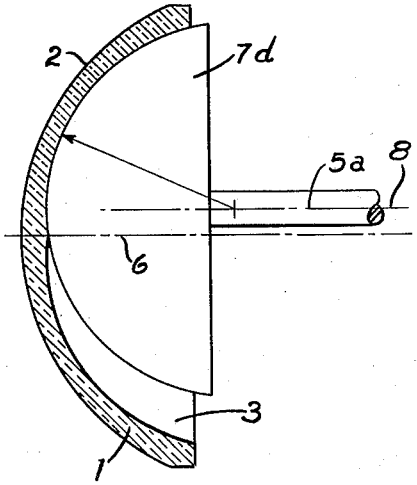
Figure 4 represents the manufacture of a mirror in accordance to this invention in which the axis of the generatrix is parallel with the principal axis of the mirror.

In Figure 4 the axis 8 of the generatrix is parallel with, but offset from, the principal axis 6 of the mirror. If we presume that the part 7—$d$ in this figure is a grinding lap, it will be noted that the cusp hereinafter referred to acts to hold the lap in proper offset relation to the axis of the mirror.

By my invention I am enabled to produce a mirror having the optical advantages of a toroidal refracting face which at the same time possesses the manufacturing advantages of having a toroidal surface that is capable of being mechanically ground and polished, and the further manufacturing advantage of having small variation in the thickness of the mirror throughout any diameter thereof. By having the arc which generates the refracting face rotate about the principal axis of the mirror and struck from a point also rotating about such axis in a plane normal thereto and intersecting the same at a distance from the vertex of the mirror less than the radii of such arc, there results the formation of a slightly thickened portion, or cusp, at the optical center of the lens thereby reducing the great inequality in thickness between the central portion of a mirror and the marginal portion which heretofore has led to manufacturing difficulties due to the unequal distribution of the metal. In fact by this invention the thickness of the glass at the center can be made substantially the same as the thickness of the glass at the marginal portion. The cusp thus formed is of value, moreover, in the operations of grinding and lapping in that it serves, as it were, as an anchorage or abutment to hold the grinding head in proper position instead of permitting it to shift toward the center of the mirror, as is its tendency to do. By a "toroidal" surface I mean a surface generated by the revolution of a conic section or a curve approximating a conic section around an axis which lies in the plane of the generating curve but does not pass through its center.

Having thus described my invention what I claim is,—

1. A catadioptric projector having an optical axis, a spherical rear reflecting surface and a concave front refracting surface symmetrical about the optical axis, the latter being a toroidal surface the generatrix of which is symmetrical about an axis at an angle to the optical axis.

2. A catadioptric projector having an optical axis, spherical rear reflecting surface and a concave front refracting surface symmetrical about the optical axis, the latter being a toroidal surface the generatrix of which is symmetrical about an axis other than the optical axis.

3. A catadioptric projector having an optical axis, a spherical rear reflecting surface, and a toroidal concave front refracting surface described by an arc rotated about the optical axis of the projector and struck from a point also rotated about the optical axis, such point being rotated in a plane normal to such axis, and intersecting the same at a distance from the vertex of the projector less than the radius of such arc.

4. A catadioptric projector having an optical axis, a spherical rear reflecting surface, and a concave front refracting surface symmetrical about the optical axis, the refracting surface being toroidal and being formed by a curved generatrix rotated about the optical axis and symmetrical about an axis other than the optical axis, at least the portion of the generatrix intersecting the optical axis being struck from a point rotated about the optical axis in a plane normal to the optical axis and intersecting the same at a distance from the vertex of the projector less than the radius of said portion.

STATES LEE LEBBY.